(12) United States Patent
Beals

(10) Patent No.: US 6,990,501 B2
(45) Date of Patent: Jan. 24, 2006

(54) METHOD FOR ORGANIZING LABORATORY INFORMATION IN A DATABASE

(75) Inventor: Thomas P. Beals, Medford, MA (US)

(73) Assignee: Monsanto Technology, LLC, St. Louis, MO (US)

( * ) Notice: Subject to any disclaimer, the term of this patent is extended or adjusted under 35 U.S.C. 154(b) by 453 days.

(21) Appl. No.: 09/991,693

(22) Filed: Nov. 26, 2001

(65) Prior Publication Data

US 2002/0065805 A1   May 30, 2002

Related U.S. Application Data

(60) Provisional application No. 60/250,105, filed on Nov. 30, 2000.

(51) Int. Cl.
*G06F 17/00* (2006.01)
(52) U.S. Cl. .................................... 707/104.1; 702/19
(58) Field of Classification Search ................. 707/104
See application file for complete search history.

(56) References Cited

U.S. PATENT DOCUMENTS

| | | | |
|---|---|---|---|
| 5,614,415 A | 3/1997 | Markin | |
| 5,809,297 A | 9/1998 | Kroenke et al. | |
| 5,813,865 A * | 9/1998 | Greenbowe et al. | 434/276 |
| 5,819,086 A | 10/1998 | Kroenke | |
| 5,924,100 A | 7/1999 | Chang et al. | |
| 5,946,471 A * | 8/1999 | Voorhees et al. | 703/23 |
| 5,950,192 A | 9/1999 | Moore et al. | |
| 5,960,438 A | 9/1999 | Chang et al. | |
| 5,960,440 A * | 9/1999 | Brenner et al. | 707/104.1 |
| 6,047,284 A | 4/2000 | Owens et al. | |
| 6,190,868 B1 * | 2/2001 | Rothberg et al. | 435/6 |

OTHER PUBLICATIONS

"The Windows (TM) Interface, An Application Design Guide", 1992, Microsoft Press, pp. 21 and 32.*
"OLE 2 (TM) Programmer's Reference, vol. one", 1992, Microsoft Press, pp. 22-25, 36-39, and 663.*

* cited by examiner

*Primary Examiner*—Jean M. Corrielus
*Assistant Examiner*—Joon Hwan Hwang
(74) *Attorney, Agent, or Firm*—Thomas E. Kelley; Thomas E. Holsten; David R. Marsh

(57) ABSTRACT

The present invention is in the field of database information organization. More specifically, the present invention relates to the organization of laboratory procedure information for use in a database.

2 Claims, 4 Drawing Sheets

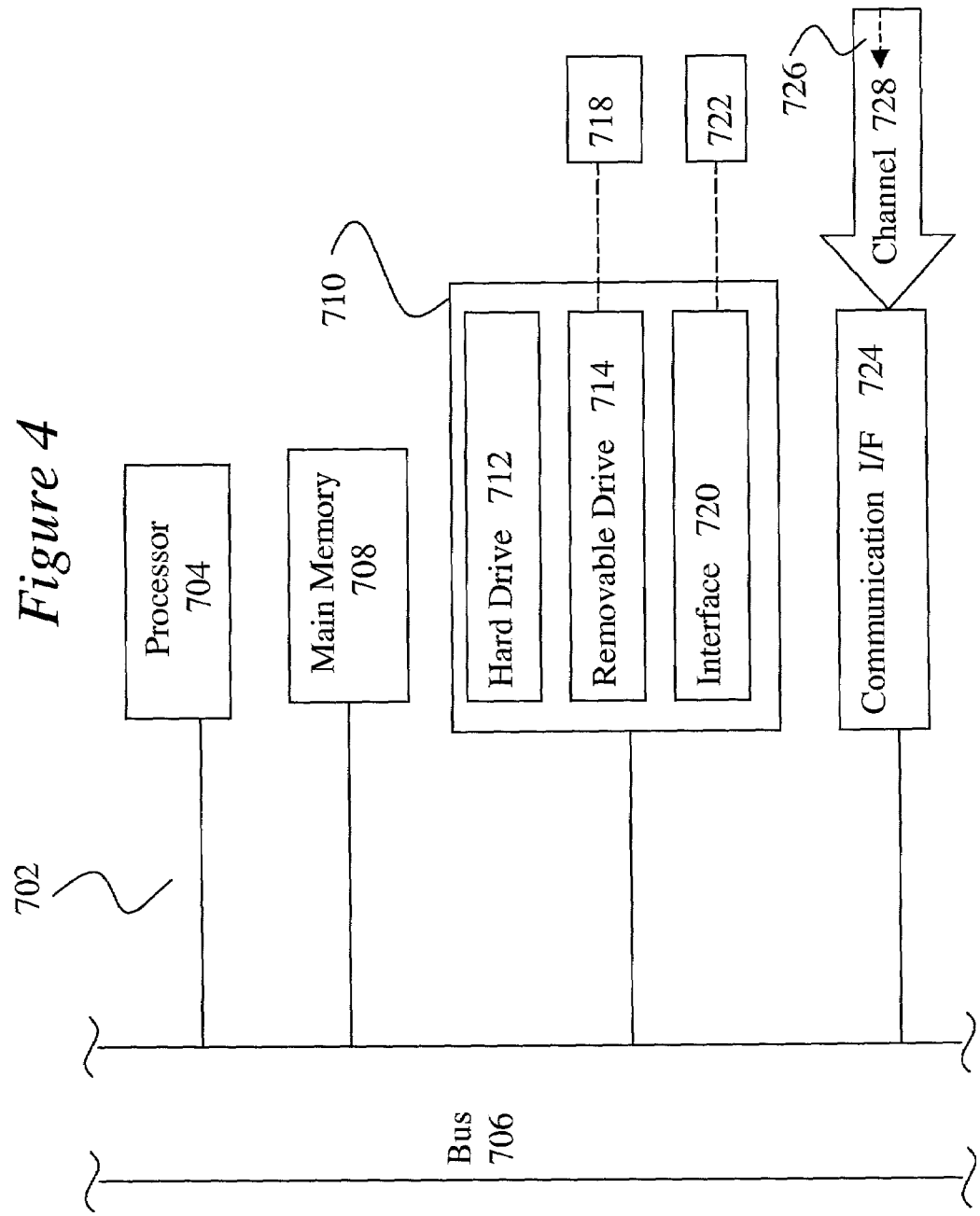

METHOD FOR ORGANIZING LABORATORY INFORMATION IN A DATABASE

This application claims the benefit of Provisional Application No. 60/250,105, filed Nov. 30, 2000.

FIELD OF THE INVENTION

The present invention is in the field of database information organization. More specifically, the present invention relates to the organization of laboratory procedure information for use in a database.

BACKGROUND OF THE INVENTION

Databases are useful for storing information in a manner that allows facile searching and retrieval of specific data. Examples of database programs that allow data to be stored in a relational database are Oracle (Oracle Corporation, 500 Oracle Parkway, Redwood Shores, Calif.), Access (Microsoft Corporation, One Microsoft Way, Redmond, Wash.), DB2 (International Business Machines Corporation, New Orchard Road, Armonk, N.Y.), SQL/DS (International Business Machines Corporation, New Orchard Road, Armonk, N.Y.), Sybase (Sybase, Inc., 6475 Christie Ave., Emeryville, Calif.), SQLbase (Centura Corporation, 975 Island Drive, Redwood Shores, Calif.), INFORMIX (Informix Corporation, 4100 Bohannon Drive, Menlo Park, Calif.), and CA-OpenIngres (Computer Associates International, Inc., One Computer Associates Plaza Islandia, N.Y.), among others. These database programs, or database management systems (DBMSs) generally use structured query language (SQL) to interrogate and process data in a database.

Databases such as those listed above have been used with object-oriented information schemes so that data can be entered, stored, and retrieved in a manner that represents the real world elements from which the data is taken. Examples of such object-oriented database schemes include schemes for semantic object modeling, object and class elements, and nontraditional object oriented databases (see, for example, U.S. Pat. Nos. 5,809,297, 5,960,438, 5,819,086, 6,047,284, and U.S. Pat. No. 5,924,100, all of which are herein incorporated by reference in their entirety).

Although databases have been implemented for a variety of purposes, representation of laboratory procedures in a database can be difficult. Different laboratory procedures can have many different types of components that are specific to one or a few procedures. In order to use a conventional database organizational scheme that has been designed for one laboratory procedure with a laboratory procedure for which it has not been designed, significant alterations in the scheme can be required.

What is needed in the art are methods for organizing laboratory information in a database that can be applied to a wide variety of laboratory procedures without the need for modification of the methods.

SUMMARY OF THE INVENTION

The present invention relates to the organization of laboratory procedure information for use in a database. In one embodiment, laboratory procedures are represented in a database with defined sets of containers, measurements, and operations. In another embodiment, laboratory procedures are represented in a database with defined sets of containers, measurements, operations, and processes.

The present invention includes and provides a method for organizing laboratory procedure information in a database, comprising: defining a set of container types, wherein container types in the set of container types each have one or more positions capable of having content; defining a set of operation types; defining a set of measurement types; performing one or more operations, wherein performing any one of the operations creates a new container with a unique identifier, and wherein the new container with a unique identifier is one of the container types in the set of container types; and, performing one or more measurements, wherein performing any one of the measurements results in associating data with content in one or more of the new containers.

The present invention includes and provides a method for organizing information in a database in order to record information from a laboratory procedure, comprising: defining a set of container types, wherein container types in the set of container types each have one or more positions capable of having content; defining a set of operation types; defining a set of measurement types; defining a set of process types; performing one or more operations, wherein performing any one of the operations creates a new container with a unique identifier, and wherein the new container with a unique identifier is one of the container types in the set of container types; performing one or more processes on one or more of the new containers, wherein performing any one of the processes changes a state in one or more of the new containers; and, performing one or more measurements, wherein performing any one of the measurements results in associating data with content in one or more of the new containers.

The present invention includes and provides a program storage device readable by a machine, tangibly embodying a program of instructions executable by a machine to perform method steps for organizing laboratory procedure information in a database, the method steps comprising: defining a set of container types, wherein container types in the set of container types each have one or more positions capable of having content; defining a set of operation types; defining a set of measurement types; performing one or more operations, wherein performing any one of the operations creates a new container with a unique identifier, and wherein the new container with a unique identifier is one of the container types in the set of container types; and, performing one or more measurements, wherein performing any one of the measurements results in associating data with content in one or more of the new containers.

The present invention includes and provides a program storage device readable by a machine, tangibly embodying a program of instructions executable by a machine to perform method steps for organizing information in a database in order to record information from a laboratory procedure, the method steps comprising: defining a set of container types, wherein container types in the set of container types each have one or more positions capable of having content; defining a set of operation types; defining a set of measurement types; defining a set of process types; performing one or more operations, wherein performing any one of the operations creates a new container with a unique identifier, and wherein the new container with a unique identifier is one of the container types in the set of container types; performing one or more processes on one or more of the new containers, wherein performing any one of the processes changes a state in one or more of the new containers; and, performing one or more measurements, wherein performing any one of the measurements results in associating data with content in one or more of the new containers.

DESCRIPTION OF THE FIGURES

FIG. 4 is a schematic representation of a device capable of implementing the methods of the present invention.

DETAILED DESCRIPTION OF THE INVENTION

Described herein are methods for the organization of laboratory procedure information for use in a database. The methods of the present invention can be implemented in a program storage device readable by a machine, tangibly embodying a program of instructions executable by a machine. The methods of the present invention operate by allowing entry of laboratory procedure data into a database in a manner that mirrors the actual laboratory procedure with generalized representations.

The methods and devices of the present invention can be used with any database implementation program that can accommodate the laboratory procedure representation scheme presented herein, including relational databases and other databases. Examples of conventional database implementation programs that can be used include, without limitation, Oracle, Access, DB2, SQL/DS, Sybase, SQLbase, INFORMIX, and CA-OpenIngres. In a preferred embodiment, the methods of the present invention are implemented with the Oracle database program.

The methods and devices of the present invention are applicable to any laboratory procedure that can be represented by the scheme presented herein. As used herein, "laboratory procedure" means any analytical procedure performed using available techniques. Laboratory procedures include procedures performed partly or wholly outside of a laboratory, such as research experiments performed in the field. Examples of laboratory procedures include, without limitation, RNA transcript profiling, DNA sequencing, DNA amplification, diagnostic procedures, testing patient samples, crop yield tests, and water sampling. In a preferred embodiment, the laboratory procedure is RNA transcript profiling.

Figure 1:
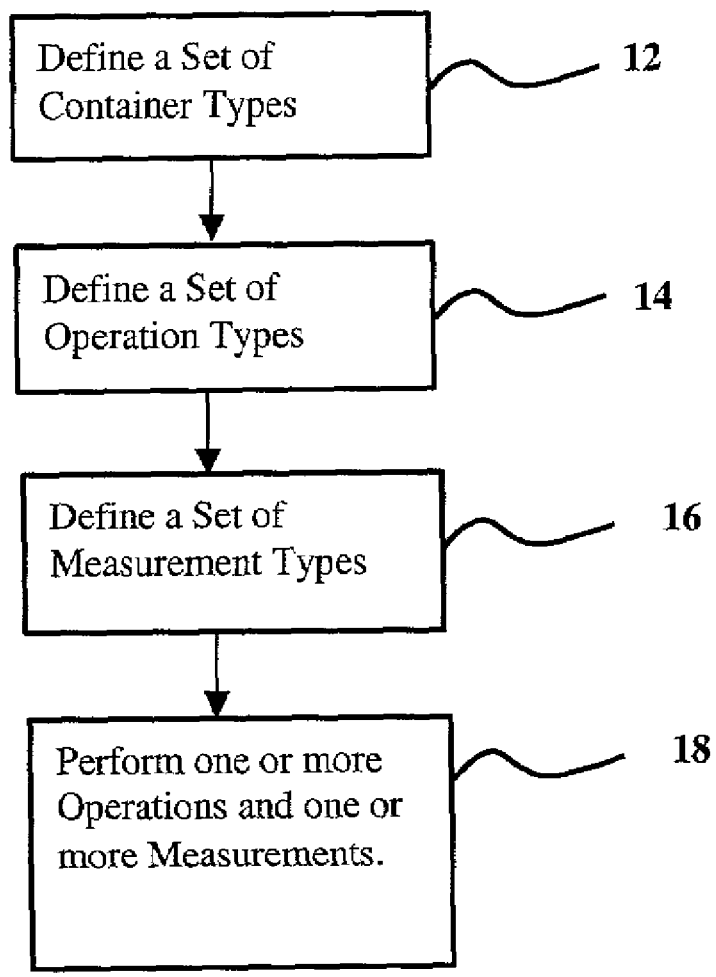
FIG. 1 is a flow diagram of one embodiment of the present invention.

FIG. 1 is a flow diagram showing one embodiment of the method of the present invention. In step 12, a set of container types is defined. As used herein, a "container" is any thing or representation of that thing with one or more unambiguously identified positions that can have content. For example, an Eppendorf tube has a single position for holding a volume, and a bitmap image has many positions for representing signal strength. A container can have as content any thing that is used in a laboratory procedure, including physical things and representations of physical things, or the lack thereof. For example, the content of an Eppendorf tube can be a fluid volume, and the content of a bitmap image position can be a displayed image on a monitor, or the digital representation of that image. In another embodiment, for example, the container can be a flat surface, such a lab bench, with demarcations separating different positions and containers, for example a test tube rack, at each position.

Any position in a container can have content or, alternatively, can lack content. As such a container can be an article or substance isolated for testing such as a quality control sample of a raw material, an intermediate product or a finished product. A container can also be a holder of articles or substances such as a tank, bag, jar, bin, box, gas cylinder, hopper, silo, barge, roll of goods and the like. A container can also be a holder of information such as a notebook, log, , chart, computer memory and the like. Examples of containers commonly used in genomics research include, without limitation, Eppendorf tube, a 96-well plate, a transcript profiling array, a freezer, any data recording medium (such as photographic and radiation recording film, photographic prints, magnetic tape and diskettes, compact discs, and the like), a bitmap images of any data recording medium, a microtitre plate, a test tube, a test tube rack, a flat surface with demarcations between positions, an Eppendorf tube holder, a device with positions in three dimensions, and a field of crops. In a preferred embodiment, the set of container types defined in step 12 comprises members selected from the group consisting of Eppendorf tube, a 96 well plate, a transcript profiling array, a freezer, a data recording medium, and a bitmap image of a data recording medium.

As used herein, "defining a set of container types" means identifying each container type and the positions of each container type that will be available during execution of the method, and inputting that information into a database. For example, if Eppendorf tubes are used in the laboratory procedure of interest, then during step 12 an Eppendorf tube will be defined as a container having a single position. If 96 well plates are used, a 96-well plate can be defined, for example, as a container having 96 positions identified as positions 1 through 96. This object type scheme allows for the ready incorporation of new steps or similar procedures to an existing set of container types. For example, if a step is added to an assay, and that step requires a new type of container, the original set of container types can be amended to include the new container, without the need to alter other containers.

In one embodiment, 1 to 1,000 or more container types are defined in the set of container types. In another embodiment, 50 to 500 container types are defined in the set of container types. In another embodiment, 10 to 100 container types are defined in the set of container types. In yet another embodiment, 2 to 20 container types are defined in the set of container types. In a further embodiment, 5 to 30 container types are defined in the set of container types. In step 12, no records representing an actual laboratory procedure have been created in the database. Rather, "defining a set of container types" establishes templates for each container type that will be used by the method to represent new containers after laboratory operations. In one embodiment, a container map type is defined along with each container type. In this embodiment, the container map uniquely identifies the positions in the container based upon a feature of the container. For example, a 96-well plate will typically have a mark on one corner that can be used by the container map to uniquely identify positions 1 through 96 in the 96-well plate. Human-readable labels for containers or container positions can be stored as aliases or synonyms corresponding to machine representations of container position identifiers, allowing any desired label to designate or indicate a container or position within a container. Container maps also can be used to store information about the contents of each position of a container after a container is created and content is added. For example, if a 96-well plate is created during an operation, then the container map type associated with a 96-plate can be accessed, assigned content in the appropriate positions, and associated with the container that was created. As the contents of the created container are altered in the laboratory procedure, the container map in the database is updated so that information about the content of the positions of the container represents the state of the contents of the actual laboratory container.

In one embodiment, the content of the positions of many similar containers is recorded once and referred to for each reference to any container position in said similar containers. For example, a production run that creates a set of transcript profiling arrays (containers) whose array elements (at positions) are identical within the limits of the manufacturing process. A single mapping of array element label (content) to position is assigned to the set of containers.

In one embodiment, containers can contain other containers. For example, a freezer, which is a type of container, can contain microtitre plates, another container type, in one or more positions, or an Eppendorf tube holder (one container type) can contain Eppendorf tubes (a second container type) in one or more positions.

In step 14, a set of operation types is defined. As used herein, an "operation" is any step in a laboratory procedure or representation thereof that results in the creation of a new container and transfer of content into that container. Operations can be for example, without limitation, separating a sample into aliquots or constitutive parts, printing RNA transcript profiling arrays using containers of PCR products as source material, reading out data from a data recording medium, creation of a plate for polymerase chain reaction (PCR), a robot run that transfers content from one container to another, transferring volume into a test tube, harvesting corn and placing it in separate hoppers, and inoculate a broth with bacteria. In a preferred embodiment, the set of operation types comprises operations selected from the group consisting of printing arrays, reading out data from a data recording medium, creation of a plate for PCR, and a robot run that transfers content from one container to another.

As used herein, "defining a set of operation types" means identifying each operation type that will be available during execution of the method, including the container type that will be created upon execution of the operation and the content that will be transferred to the newly created container, and inputting that information into a database. For example, the operation of "inoculate culture with sample" can be defined as causing the creation of a test tube container with the content of the test tube specified as 4 milliliters of minimal media and 1 microliter of culture from the source container. The result of performance of the operation is the altering of the content of the original container, creation of a second container, and addition of content to the second container.

In one embodiment, 1 to 1,000 or more operation types are defined in the set of operation types. In another embodiment, 50 to 500 operation types are defined in the set of operation types. In another embodiment, 10 to 100 operation types are defined in the set of operation types. In yet another embodiment, 2 to 20 operation types are defined in the set of operation types. In a further embodiment, 5 to 30 operation types are defined in the set of operation types.

Operations can move content in any form. For example, without limitation, an operation can be defined to move a specified volume or integer number from one container to the newly created container. Content can be changed in form as well. For example, readout of data from a data recording medium creates a new container with new content. More particularly, a computer file that results from scanning photographic media is a container for a bitmap image with digital representations of pixels in an unambiguous coordinate system that allows mapping of pixel back to the photographic media.

In one embodiment, performance of an operation leads to creation of a container map associated with the newly created container. As before, the container map can be updated to reflect any changes in the actual laboratory procedure state of the container that is being represented in the database.

In step 16, a set of measurement types is defined. As used herein, a "measurement" can be anything that yields quantitative or qualitative information about the content of one or more containers. Some qualitative information can be expressed quantitatively. For example, "hot" and "cold" are qualitative, they can also be represented by the qualitative values 1 and 0.

Measurements Indicate Properties Including:

(a) space and time properties such as length, area, volume, velocity, acceleration, position vector, angle, radius and the like;

(b) periodic properties such as period, relaxation time, frequency, wavelength, damping coefficient, and the like;

(c) mechanical properties such as mass density, specific volume, momentum, force, moment of inertia, weight, bending moment, torque, pressure, stress, strain, Young's modulus, Poisson ratio, coefficient of friction, viscosity, diffusion coefficient, surface tension, work, power, kinetic energy, Reynolds number, and the like;

(d) thermodynamic properties such as temperature, thermal expansion, heat, heat flow rate, heat capacity, specific heat, thermal diffusivity, entropy, enthalpy, Gibbs function, Helmholtz function, Planck function, latent heat, Joule-Thompson coefficient, compressibility, and the like;

(e) electrical and magnetic properties such as electric charge, electric current, electric potential, electric flux, capacitance, permittivity, electromotive force, electric dipole moment, magnetic field strength, magnetomotive force, magnetic flux, self inductance, mutual inductance, coupling coefficient, magnetic susceptibility, magnetization, resistance, conductance, resistivity, reluctance, permeance, impedance, reactance, power, and the like;

(f) light and electromagnetic radiation properties such as radiant energy, radiant flux, radiant intensity, emissivity, luminous flux, refractive index, radiation frequency, radiation wavelength, reflection, transmission, color and the like;

(g) acoustic properties such as velocity of sound, sound intensity, loudness, acoustic absorption and the like;

(h) physical chemical properties such as amount of a substance, molar mass, molar volume, mole fraction, molality, fugacity, concentration of a solute, chemical potential, partial pressure, pH, osmotic pressure, oxidation state, elemental analysis, electrochemical potential, van der Waals forces, electron charge, ionic strength, angle of optical rotation, rate of reaction, equilibrium constant, x-ray diffraction, stereoisomers and the like;

(i) molecular physics properties such as number of molecules, molecular velocity, mean free path, Boltzmann function, statistical weight, dipole moment of molecule, nuclear spin, and the like;

(j) atomic and nuclear physics properties such as atomic number, mass number, magnetic moment of a particle, mean life, half life of an isotope, Bohr radius, spin lattice relaxation time and the like;

(k) nuclear reaction and ionizing radiation properties such as reaction energy, scattering angle, atomic attenuation coefficient, recombination coefficient and the like;

(l) quantum mechanics properties such as charge density of electrons, annihilation operators, creation operators, probability current density and the like;

(m) solid state physics properties such as crystal lattice indices, Bragg angle, Burgers vector, order of reflection circular wave of vector, Fermi energy, Peltier coefficient piezoelectric coefficient Curie temperature, Hall coefficient and the like;

(n) molecular spectroscopy properties such as quantum number of electron spin, quantum number of nuclear spin, quantum number of vibrational mode, degeneracy of vibrational mode, rotational constant of diatomic molecule and the like;

(o) sense properties include taste, sound, tactile sensation, visual contact, smell and the like;

(p) biological and genomic properties such as sex, age, amino acid content, cell function, metabolic profile, phenotype, disease, cell structure, cytoplasm composition, life cycle state, antibody, immune response, isoelectric point, transcript profile, PCR product, presence of polymorphisms, taxonomic class, and the like.

A more detailed examples of measurements useful in transcript profile operations include, without limitation, optical density at 600 nanometers of a bacterial plate, optical density at 260 nanometers ($OD_{260}$) of a DNA solution, intercalating agent quantitation of PCR product, agarose gel quantitation of PCR product, mRNA quantitation by real time reverse transcriptase PCR, readout signal for each position in an array, density of crops in a field, and number of ears per corn plant. In a preferred embodiment, the set of measurement types comprises measurements selected from the group consisting of $OD_{600}$ of a bacterial plate, $OD_{260}$ of a DNA solution, intercalating agent quantitation of PCR product, agarose gel quantitation of PCR product, transcript profiling quantitation of RNA, mRNA quantitation by reverse transcriptase PCR, and readout position for each position in an array?.

As used herein, "defining a set of measurement types" means identifying each measurement type that will be available during execution of the method, including the format in which the measurement information will be input, and inputting that information into a database. For example, the $OD_{600}$ of a bacterial plate can be defined as the optical density of a bacterial plate as represented by a real number. Measurements are associated with content of a container in a database.

In one embodiment, 1 to 1,000 or more measurement types are defined in the set of measurement types. In another embodiment, 50 to 500 measurement types are defined in the set of measurement types. In another embodiment, 10 to 100 measurement types are defined in the set of measurement types. In yet another embodiment, 20 to 20 measurement types are defined in the set of measurement types. In a further embodiment, 5 to 30 measurement types are defined in the set of measurement types.

Steps 12, 14, and 16 can be performed in any order. In a preferred embodiment, the defined sets of containers, operations, and measurements comprise every container, operation, and measurement that make up a laboratory procedure. In another embodiment, the defined sets of containers, operations, and measurements comprise every container, operation, and measurement that make up more than one laboratory procedure.

After completion of steps 12, 14, and 16, the different types of representations of containers, operations, and measurements have been defined, and laboratory procedure data can be entered into a database using the representations. These representations can be input in the database, for example, in the form of numbers or letters. Alternatively these representations can be input by importing a suitably formatted computer file that might, for example, be generated by a measurement device or by a pipetting robot.

In step 18, one or more operations can be performed. As used herein, "performing one or more operations" means executing one or more of the operations defined in step 14, which includes inputting any necessary data into the database. As described above, the operations performed in step 18 will represent the actual operations performed in the laboratory procedure. The user of the method performs operations by selecting an operation from the set of operation types and inputting any data required for the operation (such as date, sample number, technician number, etc.). As operations are performed, containers and/or container maps are added to the database, and the content of containers, as shown in the container maps, is updated.

Also in step 18, one or more measurements can be performed. As used herein, "performing one or more measurements" means executing one or more of the measurements defined in step 16 and inputting the resulting data into the database. The input measurement values are associated with the contents of the positions on which the measurement were performed. For example, the contents of an Eppendorf tube could be associated with a real number measurement representing the $OD_{600}$ of the content of the Eppendorf tube. In one embodiment, no measurements are taken.

Performing measurements and operations in step 18 can be done in any order as needed to represent the laboratory procedure. For example, an operation can be followed by a measurement, which is followed by more operations and measurements. By performing operations and measurements, data associated with the laboratory procedure are entered into a database as they are generated.

Figure 2:
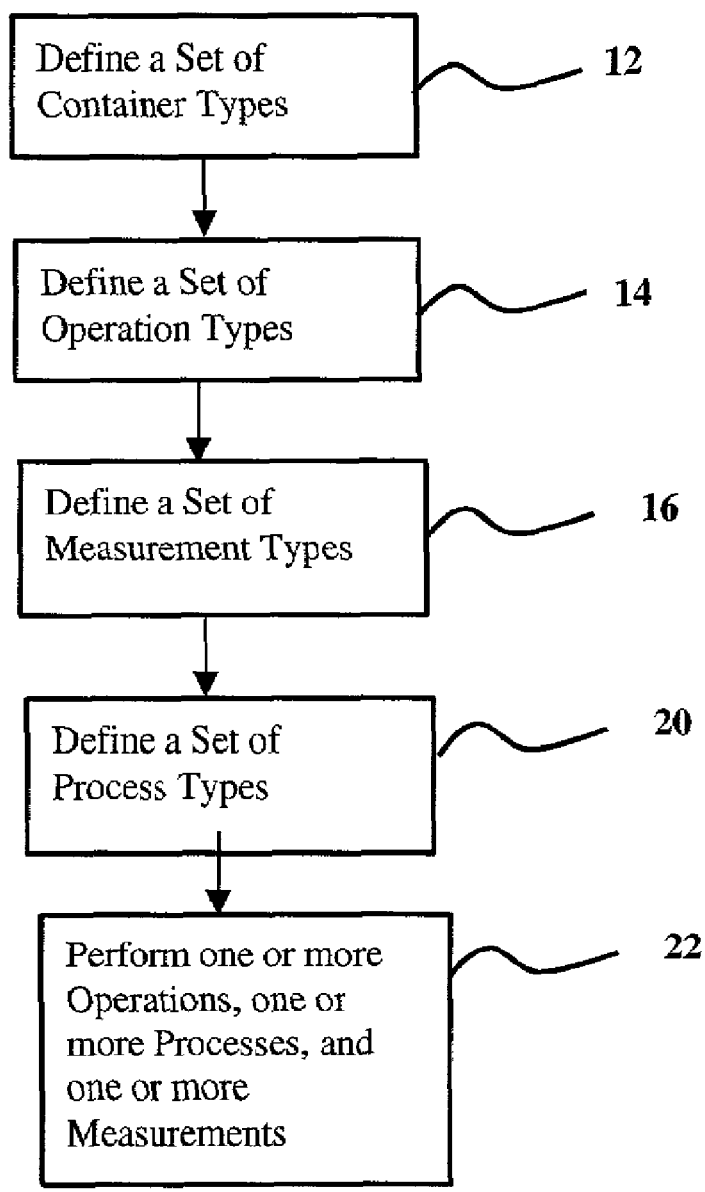
FIG. 2 is a flow diagram of one embodiment of the present invention.
Figure 3:
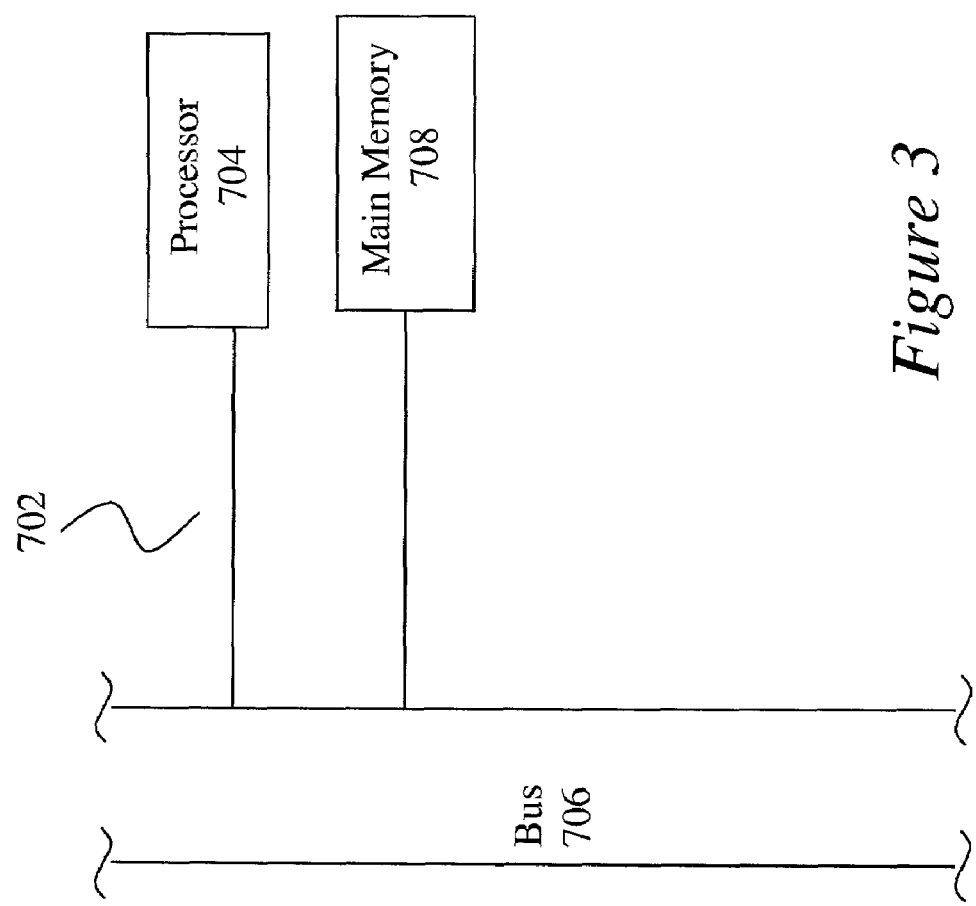
FIG. 3 is a schematic representation of a device capable of implementing the methods of the present invention.

In FIG. 2, a flow diagram of another embodiment of the present invention is shown.

Steps 12, 14, and 16 are performed as before. In step 20, a set of process types are defined. As used herein, a "process" is anything that causes a change in the state of a container. The utility of recording processes is in allowing recording of changes to containers where the label attached to the container does not change. Examples of processes include, without limitation, fertilization of a corn field, incubating a container at specified temperature and under specified conditions (for example shaken or not shaken), PCR cycling, denaturing arrays, enzymatic synthesis of first strand cDNA from RNA, hybridizing first-strand radiolabeled cDNA probe with array, physically associating data recording media screens with experimental material for defined time periods, readout of data from data recording media screens. In a preferred embodiment, a process comprises members selected from the group consisting of incubating, PCR cycling, denaturing arrays, prepare probe from RNA, hybridize probe with array, incubate data recording media screens, and readout data recording media screens.

As used herein, "performing a process" means executing one or more of the processes defined in step 20, which includes inputting any necessary data into the database. Performing a process results in changing the state of the contents of a container. The change in state is associated with the container in the database. In one embodiment, processes have defined start and finish times.

In one embodiment, 1 to 1,000 or more process types are defined in the set of process types. In another embodiment, 50 to 500 process types are defined in the set of process types. In another embodiment, 10 to 100 process types are defined in the set of process types. In yet another embodiment, 2 to 20 process types are defined in the set of process types. In a further embodiment, 5 to 30 process types are defined in the set of process types.

In step 22, one or more operations, measurements, and processes are performed. As before, performing can be done in any order.

In a preferred embodiment, the defined sets of containers, operations, processes, and measurements comprise every container, operation, process, and measurement that make up a laboratory procedure. In another embodiment, the defined sets of containers, operations, processes, and measurements comprise every container, operation, process, and measurement that make up more than one laboratory procedure.

In another embodiment, any portion of defining steps 12, 14, 16, and 20 can be done in any order with any of the other portions. For example, a single container can be defined, then a measurement can be defined, then another container can be defined, then a process can be defined, and so on until all of the sets have been defined.

In another embodiment, the defined processes, operations, and measurements used in the method can be associated with external protocols and versions. For example, the process of "incubating" can be associated with a number that represents a protocol, a human or machine-readable procedure that is external or internal to the database, for incubating an enzymatic reaction. When queried, the database program can return not only the process, but also the exact protocol and version used for that process. For example, a certain protocol for incubating enzymatic reactions that is located in a laboratory techniques manual can be associated with a process in the database.

The database information can be queried as is known in the art. For example, structured query language (SQL) can be used to query a database into which laboratory procedure information has been entered according to the methods of the present invention.

The present invention allows the organization of laboratory procedure data in a database according only to the containers, operations, and measurements that are defined for the procedure. In another embodiment, the present invention allows the organization of laboratory procedure data in a database according only to the containers, operations, processes, and measurements that are defined for the procedure.

Implementation:

A computer system capable of carrying out the functionality and methods described above is shown in more detail in FIG. 7. A computer system 702 includes one or more processors, such as a processor 704. The processor 704 is connected to a communication bus 706. The computer system 702 also includes a main memory 708, which is preferably random access memory (RAM). Various software embodiments are described in terms of this exemplary computer system. After reading this description, it will become apparent to a person skilled in the relevant art how to implement the invention using other computer systems and/or computer architectures.

In a further embodiment, shown in FIG. 6b, the computer system can also include a secondary memory 710. The secondary memory 710 can include, for example, a hard disk drive 712 and/or a removable storage drive 714, representing a floppy disk drive, a magnetic tape drive, or an optical disk drive, among others. The removable storage drive 714 reads from and/or writes to a removable storage device 718 in a well known manner. The removable storage device 718, represents, for example, a floppy disk, magnetic tape, or an optical disk, which is read by and written to by the removable storage drive 714. As will be appreciated, the removable storage device 718 includes a computer usable storage medium having stored therein computer software and/or data.

The computer system can also include a communications interface 724. The communications interface 724 allows software and data to be transferred between the computer system and external devices. Examples of the communications interface 724 can include a modem, a network interface (such as an Ethernet card), a communications port, a PCM-CIA slot and card, etc. Software and data transferred via the communications interface 724 are in the form of signals 726 that can be electronic, electromagnetic, optical or other signals capable of being received by the communications interface 724. Signals 726 are provided to communications interface via a channel 728. A channel 728 carries signals 726 in two directions and can be implemented using wire or cable, fiber optics, a phone line, a cellular phone link, an RF link and other communications channels. In one embodiment, the channel is a connection to a network. The network can be any network known in the art, including, but not limited to, LANs, WANs, and the Internet. Database information can be stored in remote systems and databases, or distributed databases, among others, and transferred to computer system for processing via the network. In one embodiment, database information is received through the Internet via the channel 728. Database information can be input into the system and stored in the main memory 708. Input devices include the communication and storage devices described herein, as well as keyboards, barcode scanners, voice input, and other devices for transferring data to a computer system.

In this document, the terms "computer program medium" and "computer usable medium" are used to generally refer to media such as the removable storage device 718, a hard disk installed in hard disk drive 712, and signals 726. These computer program products are means for providing software to the computer system.

Computer programs (also called computer control logic) are stored in the main memory 708 and/or the secondary memory 710. Computer programs can also be received via the communications interface 724. Such computer programs, when executed, enable the computer system to perform the features of the present invention as discussed herein. In particular, the computer programs, when executed, enable the processor 704 to perform the features of the present invention. Accordingly, such computer programs represent controllers of the computer system.

In an embodiment where the invention is implemented using software, the software may be stored in a computer program product and loaded into the computer system using the removable storage drive 714, the hard drive 712 or the communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

What is claimed is:

1. A method for organizing information in a database in order to record information from an RNA transcript profiling laboratory procedure, comprising:

defining a set of container types, wherein container types in said set of container types each have one or more positions capable of having content and wherein said set of container types comprises members selected from a group consisting of an eppendorf tube, a 96 well plate, a transcript profiling array, a freezer, a data recording media screen, and a bitmap image of a data recording media screen;

defining a set of operation types, wherein said set of operation types comprises members selected from a group consisting of printing arrays, reading out a data recording media screen, creation of a plate for PCR, and a robot run that transfers content from one container to another;

defining a set of measurement types, wherein said set of measurement types comprises members selected from a group consisting of $OD_{600}$ of a bacterial plate, $OD_{260}$ of a DNA solution, intercalating agent quantitation of PCR product, agarose gel quantitation of PCR product, mRNA quantitation, and readout signal for each position in an array;

defining a set of process types, wherein said set of process types comprises members selected from a group consisting of incubating, PCR cycling, denaturing arrays, prepare probe from RNA, hybridize probe with array, incubate data recording media screens, and readout data recording screen;

performing one or more operations of said set of operation types, wherein performing any one of said operations creates one or more new containers with a unique identifier, and wherein said one or more new containers with a unique identifier is one of said container types in said set of container types;

performing one or more processes of said set of process types on said one or more new containers, wherein performing any one of said processes changes a state in said more new containers; and performing one or more measurements of said set of measurement types, wherein performing any one of said measurements results in associating data with content in said one or more new containers.

2. A program storage device readable by a machine, tangibly embodying a program of instructions executable by a machine to perform method steps of claim 1 for organizing information obtained from RNA transcript profiling in a database.

* * * * *